Nov. 19, 1940.    H. R. HAASE    2,222,226
TILT GEAR UNIT FOR VENETIAN BLINDS
Filed Feb. 7, 1940    2 Sheets-Sheet 1
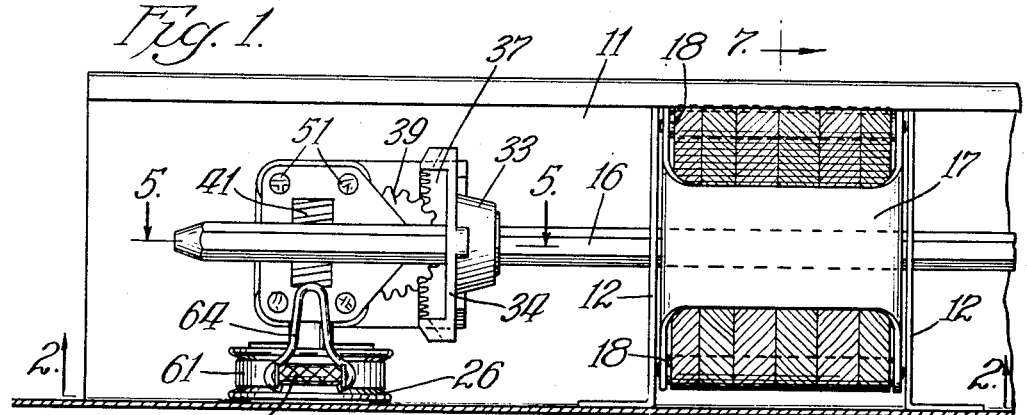
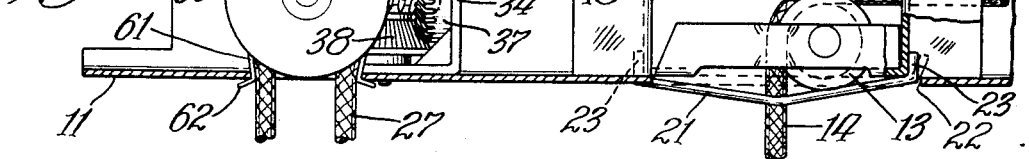
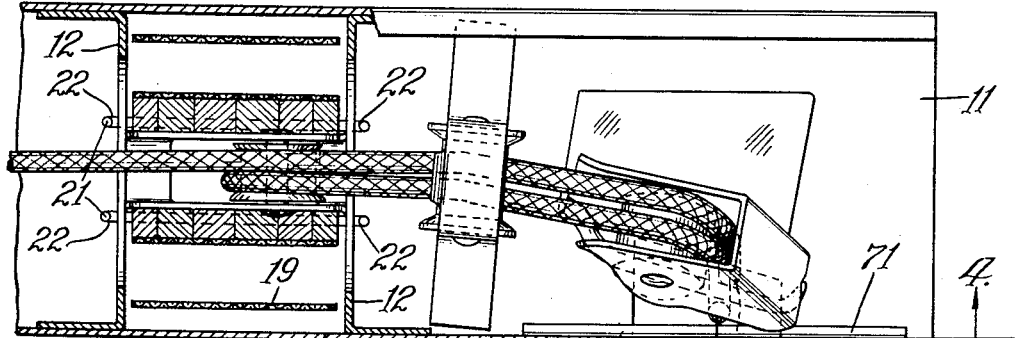
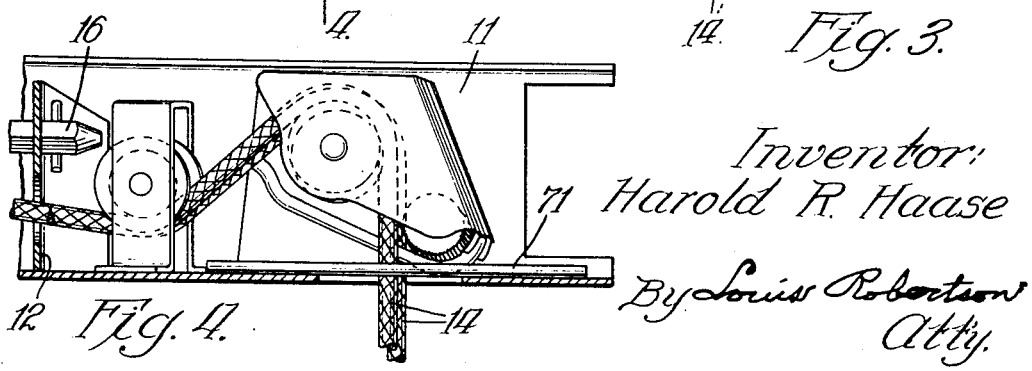
Inventor:
Harold R. Haase
By Louis Robertson
Atty.

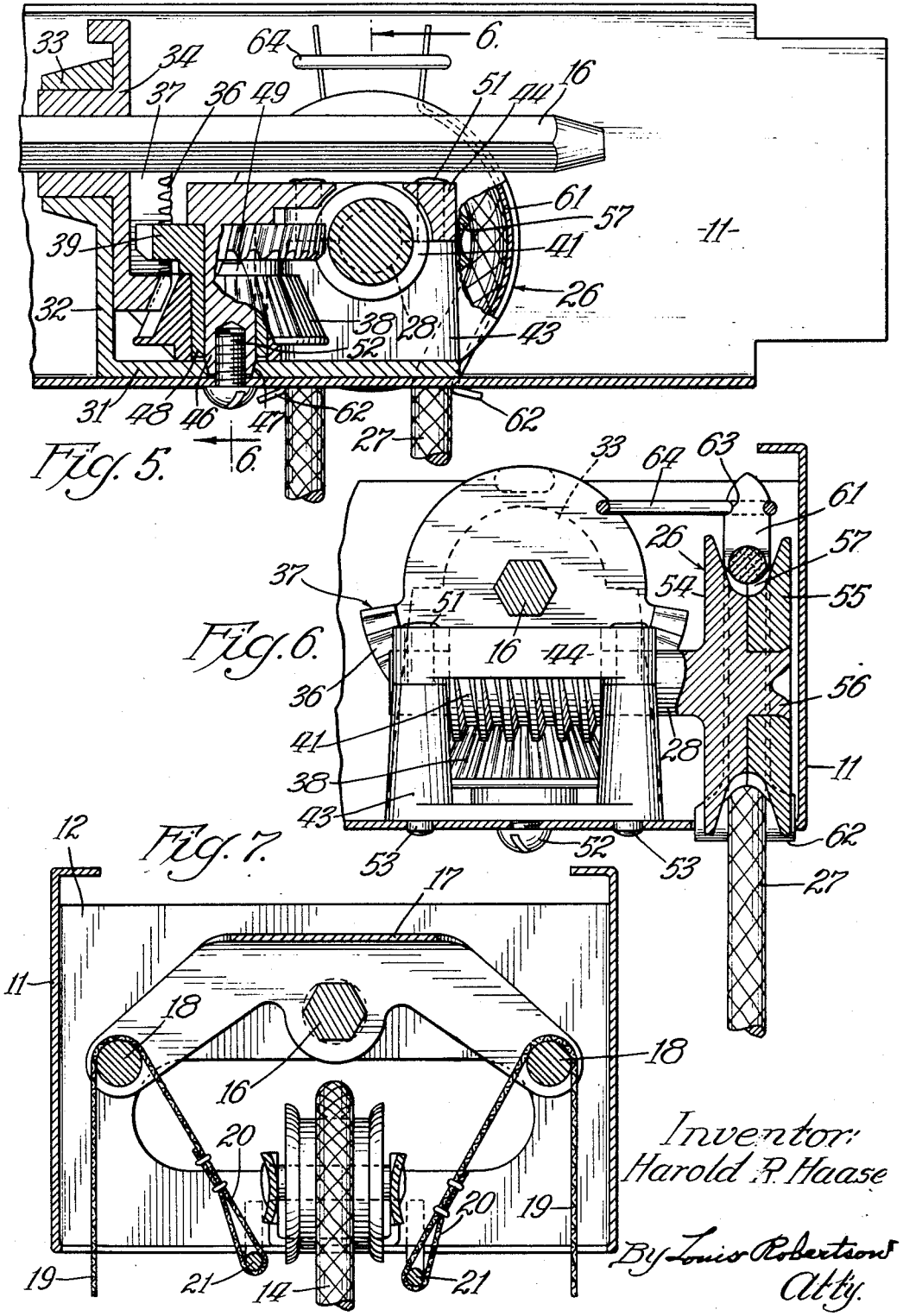

160. CLOSURES, PARTITIONS & PANELS, FLEXIBLE & PORTABLE.

Patented Nov. 19, 1940

2,222,226

UNITED STATES PATENT OFFICE 2,222,226

TILT GEAR UNIT FOR VENETIAN BLINDS

Harold R. Haase, River Forest, Ill.

Application February 7, 1940, Serial No. 317,777

7 Claims. (Cl. 156—17)

According to modern styles the upper portions of Venetian blinds are often exposed, as distinguished from being concealed by draperies or the like. Accordingly, it has become common to build a blind with the tilting mechanism enclosed in a housing which is secured at the top of the window frame. For the sake of neatness this housing is preferably made quite low or narrow in height, and various inventions have been made for reducing the height occupied by the housing. According to these inventions a tilt tape control device is provided for each tilt tape or ladder tape of the blind, these devices commonly being operated by a hexagonal shaft which runs longitudinally of the housing or control head and is necessarily positioned somewhere near the vertical center of the space available. It has also been common to provide within the housing a cross shaft having some sort of worm gear engagement with the hexagonal shaft, the cross shaft carrying a pulley on which the tilt cord rides to rotate the shafts in one direction or the other for the purpose of tilting the slats of the blind. Many expedients have been considered for gearing the cross shaft to the longitudinal shaft in a manner that would permit ease of operation and avoid excessive wear so that the operation would be dependably easy and satisfactory throughout the life of a blind. The difficulty in this connection arises from the fact that the cross shaft must necessarily also be positioned somewhere near the vertical center of the casing, which, as previously mentioned, is of relatively narrow height. Accordingly, there are two shafts having their axes not very far apart and one of which must drive the other. Furthermore, the load on the driven or longitudinal shaft is sometimes considerable since in the extreme positions of the tapes the entire weight of the blind is supported by one tape. Because of the close positioning of the two shafts, a worm wheel on the longitudinal shaft directly engaging a worm on the cross shaft must have a very short radius. The short radius in turn produces high frictional pressures and it has been found that with this construction there is excessive wear. In order to have parts capable of withstanding this wear, the threads of the worm cannot be of very fine pitch and hence it is difficult to get a gearing as low as is desired for ease of operation.

According to the present invention this difficulty has been solved by providing a very compact and surprisingly inexpensive gear unit in which two intervening gears are provided between the worm on the cross shaft and the gear on the longitudinal shaft, and the worm gear engaging the worm on the cross shaft is horizontally disposed so that its radius need not be restricted by the narrow height of the housing or the close spacing of the shafts. The gear unit is so designed that it may be very inexpensively manufactured, all of the parts thereof being die-cast and easily assembled.

Additional advantages and objects of the invention will be apparent from the following description and from the drawings, in which:

Fig. 1 is a fragmentary plan view of a Venetian blind chosen for illustration of the invention, with part of the casing broken away for the sake of clarity.

Fig. 2 is a fragmentary longitudinal sectional view taken approximately on the line 2—2 of Fig. 1, with a part of the bracket broken away for the sake of clarity.

Fig. 3 is a fragmentary view corresponding to Fig. 1 but showing the other end of the blind control head.

Fig. 4 is a fragmentary vertical longitudinal sectional view taken approximately on the line 4—4 of Fig. 3.

Fig. 5 is a fragmentary vertical sectional view taken approximately on the line 5—5 of Fig. 1.

Fig. 6 is a fragmentary transverse vertical sectional view taken on an irregular line 6—6 of Fig. 5 to show various details of the construction.

Fig. 7 is a fragmentary view taken approximately on the line 7—7 of Fig. 1.

A preferred form of the invention has been chosen for illustration and description, in compliance with Section 4888 of the Revised Statutes, but persons skilled in the art will readily perceive other means for accomplishing the same results, and the claims are therefore to be construed as broadly as possible, consistent with the prior art.

Although the invention may be used with woden head rails, it has been illustrated as used with a sheet metal, channel-shaped housing 11. As described in my prior Patent No. 2,172,657, this housing may have brackets 12 secured therein at the position of each tilt tape on the Venetian blind which, it should be understood, is supported by the illustrated control head. Each of the brackets 12 supports a pulley 13 from which one of the raising cords 14 depends.

A tilt control rod 16 extends longitudinally of the housing 11 and through all of the brackets 12. Carried by the rod 16 within each bracket is a rocker 17, seen best in Fig. 7. Each rocker carries a pair of rollers 18 which are raised and lowered by the rocker. A tilt tape 19 passes over each roller 18, one end extending down to support and tilt the slats and the other having a loop formed therein and being secured to a wire clip 21. It should be understood that the tilt tapes 19 are the two webs of a conventional ladder tape.

The clips 21 are initially humped at their mid portions as seen at full lines in Fig. 2. After they have been threaded through the loop 20, they are inserted through suitable notches 22 in the bottom wall of casing 11 and flattened out as by being struck on their humps by a hammer. This causes a lug 23, comprising an upturned end of the clip 21, to be positioned at such an angle as to retain the clip 21 in place. The lug 23 is initially disposed at an obtuse angle from the main portion of the clip 21 and this angle does not change.

It will be observed that the height occupied by the housing 11 is quite small. As seen from Figs. 1 and 2, the height is considerably less than the width. Furthermore, it will be observed that an inherent characteristic of the structure described is that the control rod or shaft 16 is naturally positioned somewhere near the vertical center of the housing 11. As a matter of fact, it is positioned above the center, chiefly to make room for the raising pulleys 13 and cords 14 therebelow. The control rod 16 is driven by means of a pulley 26. This pulley is desirably concealed within the housing 11 and is of a fairly large radius in order to provide adequate traction between it and a control cord 27 by which it is operated. It follows that the axis of pulley 26 and hence its shaft 28 (Fig. 6) are positioned not far from the vertical center of the housing 11. There is, therefore, the problem of driving the shaft or rod 16 by the shaft 28 even though these two shafts are quite close together. It is common practice to use some sort of worm gearing for controlling a tilt control shaft such as the shaft 16 so as to obtain a self-locking action and smooth low gear operation. The self-locking and the low gearing are both particularly desirable because of the fact that when the blind slats are tilted to an extreme position, their weight is carried mainly by the tilt tapes 19 on one face of the blind, the tilt tapes on the opposite face of the blind hanging slack. With large blinds there is therefore considerable weight carried by one side of the rocker mechanisms, this weight opposing a further tilting movement and tending to turn the shaft 16 if it is not locked.

This same weight makes it highly impractical to drive the shaft 16 simply by putting a worm wheel thereon and driving it with a worm on the shaft 28. The worm wheel would have to have such a short radius that its torque arm would be short, its area of contact with the worm would be small, and hence the operating pressures would be high. Not only would this result in relatively high total friction causing hard operation, but, more important, it would result in rapid wear of the parts.

According to the present invention this difficulty is overcome by a specially developed gear unit, the details of which are best seen in Fig. 5. The gear unit is carried by a base plate or casting 31 having an upstanding leg 32 formed with a boss 33 thereon. Within this boss is journaled a die-cast bevel gear segment 34, the gear teeth 36 being formed at the end of a flange 37 thereon. Meshing with the teeth 36 is a bevel gear 38 which is keyed to a worm wheel 39. The worm wheel 39 in turn meshes with a worm 41, preferably formed integrally by die-casting on the shaft 28. The worm has been illustrated as a two-thread worm since it has been found that this works out best.

It will be observed that the worm wheel 39 lies in a plane parallel to the driven shaft 16 and furthermore extends beyond the teeth 36. Thus, it is seen that both the bevel gear segment 34 and the worm wheel 39 can be of considerably larger radius than would be possible between the axis of the shaft 16 and the worm 41. Furthermore, the gears 34 and 38 have a gear reducing effect so that the force exerted by the worm 41 and worm wheel 39 is not as great as if the same worm wheel could be mounted directly on shaft 16. This reduces the friction and wear between the worm 41 and the worm wheel 39 to such an extent that this entire gear unit may now be made up of die-castings.

An inexpensive manner of mounting these gears together is illustrated in Fig. 5. The worm 41 and shaft 28 are carried by pillars 43, the shaft being journaled thereon by top plate 44. The top plate 44 has formed thereon an integral shaft extension 46 which extends downwardly through the worm wheel 39 and the bevel gear 38. The shaft extension 46 preferably has a tapered lower end 47 which fits into a tapered hole in the base plate 31. The worm wheel 39 preferably is provided with a sleeve 48 extending down through the bevel gear 38 and forming an elongated bearing surface between the worm wheel 39 and the shaft extension 46. A key 49 may be formed on the top of the bevel gear 38 to fit into a notch in the worm wheel 39 to key these two wheels together. Since these two wheels do not rotate with respect to one another, the bevel gear 38 may have a fairly tight fit on the sleeve 48, and hence the sleeve 48 serves as a bearing surface for the bevel gear 38. Because of the length of this bearing surface it is not necessary to have an extremely accurate fit between it and the shaft extension 46. The top plate 44 may be secured on the pillars 43 by securing lugs 51 forming integral extensions of the pillars 43 and riveted over after application of the top plate 44. The entire unit thus assembled may be secured in the housing 11 by a single screw 52, on opposite sides of which are pins 53 formed integrally on the base plate 31 and extending through suitable holes in the bottom wall of the housing 11.

As seen best in Fig. 6, the pulley 26 is preferably made up of two die-cast portions 54 and 55, the portion 54 being integral with the shaft 28 and the portion 55 being secured thereon by a peened-over hub 56. In passing around the pulley the cord 27 preferably seats on the teeth 57 extending across the bottom of the groove formed between the two pulley halves 54 and 55. Half of each tooth will of course be formed integrally on each pulley half. A very simple means of holding the cord 27 in engagement with the teeth 57 is provided in the form of two leaf springs 61 which are formed with angular lugs 62 on one end and notches 63 on the other end. As seen best in Fig. 2, the lower ends of the springs 61 fit through the opening provided for the cord 27, and the angular lugs 62 hook beneath the housing 11. The upper ends of the springs 61 are held sprung toward one another by a wire clip 64 which may be applied and removed very easily by simply springing the tips of the springs 61 toward one another. The springs 61 are formed so that they naturally assume a slightly greater radius of curvature than illustrated, with the result that they resiliently urge the cord 27 against the teeth 57.

Figs. 3 and 4 illustrate another feature of the invention, in accordance with which a straight wire 71 is spot welded at the bottom corner of the housing 11, adjacent which the raising cords 14 are drawn in raising and lowering the slats. This wire keeps the raising cords from engaging the more or less sharp edges of the opening through which they pass. The wire 71 is smooth and round and hence has very little wearing action on the cords 14.

From the foregoing it is seen that a blind has been provided which will give reliable service for a long period of time. In spite of the fact that the driven shaft and drive shaft are quite close together, they are geared together by self-locking gearing which is so designed that there is very little wear between its parts and it may be made quite cheaply by die-casting the parts and assembling them in a very simple manner.

I claim:

1. A Venetian blind having closely spaced shafts; characterized by the provision of a gear unit for the closely spaced shafts, including a worm mounted on one shaft, a worm wheel positioned in a given plane and meshing with the worm, a bevel gear coaxially mounted with the worm wheel and keyed thereto, and a second bevel gear meshing with the first bevel gear, rotating about an axis parallel to said plane, and adapted to engage the other shaft at said axis.

2. A Venetian blind having closely spaced shafts; characterized by the provision of a gear unit for the closely spaced shafts, including a worm and worm gear and a pair of toothed gears, with the worm gear and worm combination and the toothed gear combination each having a greater combined radius than the distance between the shaft centers.

3. A Venetian blind having a support housing, tilt tape control means within the housing, a control shaft associated with said tilt tape control means, a cross shaft having its axis near the axis of the control shaft, and a pulley for driving the cross shaft; characterized by the provision of a gear on the control shaft of a radius greater than the spacing between the axes of the two shafts, a second gear meshing with the first gear, a worm wheel keyed with the second gear, and a worm carried by the cross shaft meshing with the worm wheel.

4. A Venetian blind having a support housing, tilt tape control means within the housing, a control shaft associated with said tilt tape control means, a cross shaft having its axis near the axis of the control shaft, and a pulley for driving the cross shaft; characterized by the provision of a gear on the control shaft of a radius greater than the spacing between the axes of the two shafts, a second gear meshing with the first gear, a worm wheel keyed with the second gear, and a worm carried by the cross shaft meshing with the worm wheel, the worm wheel and second gear rotating about an axis perpendicular to one of the shafts and in a plane perpendicular to the other shaft.

5. In a Venetian blind, the combination of a cord and pulley, in which the pulley has a groove in which the cord fits in passing around the pulley, the base of the groove being provided with teeth, and the cord resting on said teeth, and a pair of leaf springs restrained at both ends and resiliently pressing the cord against the pulley at intermediate points on the leaf springs.

6. A Venetian blind having a driven shaft for controlling the angle of the slats, a transversely disposed drive shaft having its axis close to the axis of the driven shaft, and a gear unit for connecting the drive shaft to the driven shaft in a driving and self-locking manner, including a gear on the driven shaft having a radius in excess of that available between the two axes, a gear mounted on the drive shaft with at least one gear intervening, one of said gears being a worm meshing with a worm gear.

7. A Venetian blind control head including a housing, a pulley secured within the housing and having a groove formed therein with a tooth at the base of the groove, a cord extending around the pulley and downwardly through an opening in the housing, leaf spring means hooked around edges of the opening, sprung around the pulley, and pressing the cord thereon.

HAROLD R. HAASE.